United States Patent [19]
Allain

[11] 3,754,682

[45] Aug. 28, 1973

[54] SUGAR CANE PLANTER

[76] Inventor: Charles V. Allain, 909 2nd Street, Franklin, La. 70538

[22] Filed: Apr. 21, 1972

[21] Appl. No.: 246,225

[52] U.S. Cl. ................................ 221/185, 221/210
[51] Int. Cl. ...................................................... A01c
[58] Field of Search ........................... 221/210, 185; 214/83, 355

[56] References Cited
UNITED STATES PATENTS

| | | | |
|---|---|---|---|
| 3,387,745 | 6/1968 | Thibodeaux et al. | 221/185 |
| 2,840,269 | 6/1958 | Anderson | 221/185 |
| 3,228,431 | 1/1966 | Merki | 221/210 |

*Primary Examiner*—Samuel F. Coleman
*Assistant Examiner*—H. Grant Skaggs, Jr.
*Attorney*—Wilkinson, Mawhinney & Theibault

[57] ABSTRACT

The present disclosure is directed to a sugar cane planter which is placed on the rear of a cane cart and which receives sugar cane stood on their butt ends at the open end of the cane cart and into which a mechanical hand will enter and grasp cane stalks and transfer the stalks rearwardly clear of the cane cart and drop same into the planting furrow as the planter moves over the ground. The mechanical hand or cane grasping means is reciprocated into and out of the hopper by a mechanism which converts the rotary motion of a power drive shaft driven from the cane cart wheels into a rectilinear reciprocating motion at a speed and in synchronism with the rate of travel of the cane cart. The mechanical hand is hydraulically operated by a master cylinder which is cam operated from the power drive shaft in synchronism with the forward and backward reciprocation of the mechanical hand.

8 Claims, 7 Drawing Figures

Patented Aug. 28, 1973

SUGAR CANE PLANTER

An object of the present invention is the provision of a sugar cane planter for use with a cane cart or wagon which receives the cane resting with their butt ends sitting on the floor of the wagon and which wagon has a pusher plate hydraulically operated to move the mass of cane to the rear as shown in U. S. Pat. No. 3,387,745. The present invention provides a hopper having a closed bottom and open end with an upwardly divergent mouth into which a hydraulically actuated mechanical hand is introduced to pick up and remove cane stalks sitting on their butt ends to drop them into the planting furrow.

Another object of the present invention is the provision of a cane planter mechanism, simple in construction and operation requiring a minimum of maintenance and which may be repaired or parts replaced by even unskilled labor.

A still further object of the present invention is the provision of a cane planter which is positive in its action, simple in construction and which lays cane in a furrow without the need for complex mechanism which requires field service calls from the manufacturer.

With the foregoing and other objects in view, the invention will be more fully described hereinafter, and will be more particularly pointed out in the claims appended hereto.

In the drawings, wherein like symbols refer to like or corresponding parts throughout the several views:

FIG. 6 is a fragmentary side elevational view with parts broken away showing the mechanism of the hydraulic device for opening and closing the mechanical planting hand.

CANE WAGON OR CART

Figure 1:
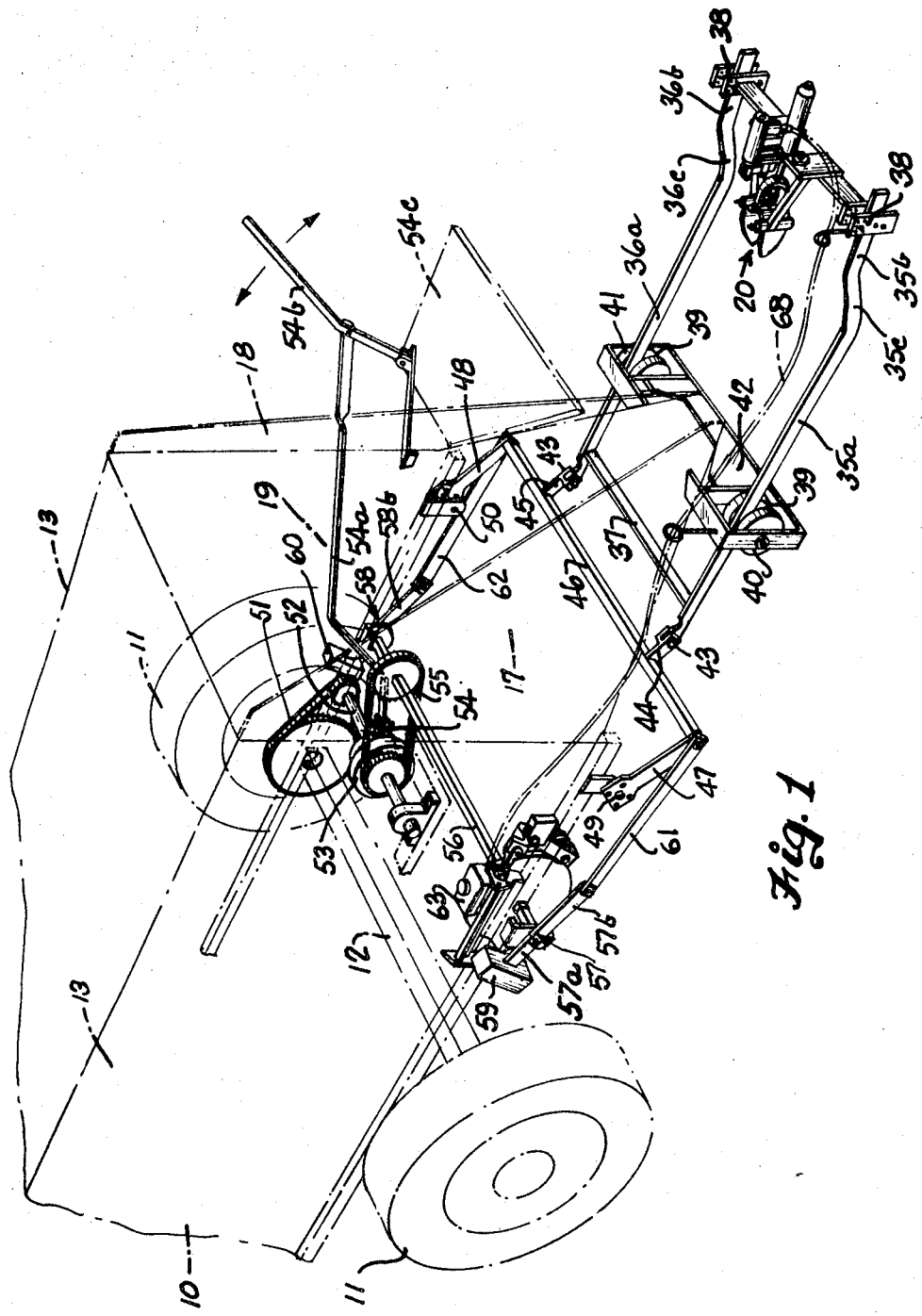
FIG. 1 is a perspective view of the sugar cane planter of the present invention showing its position relative to a cane wagon.
Figure 2:
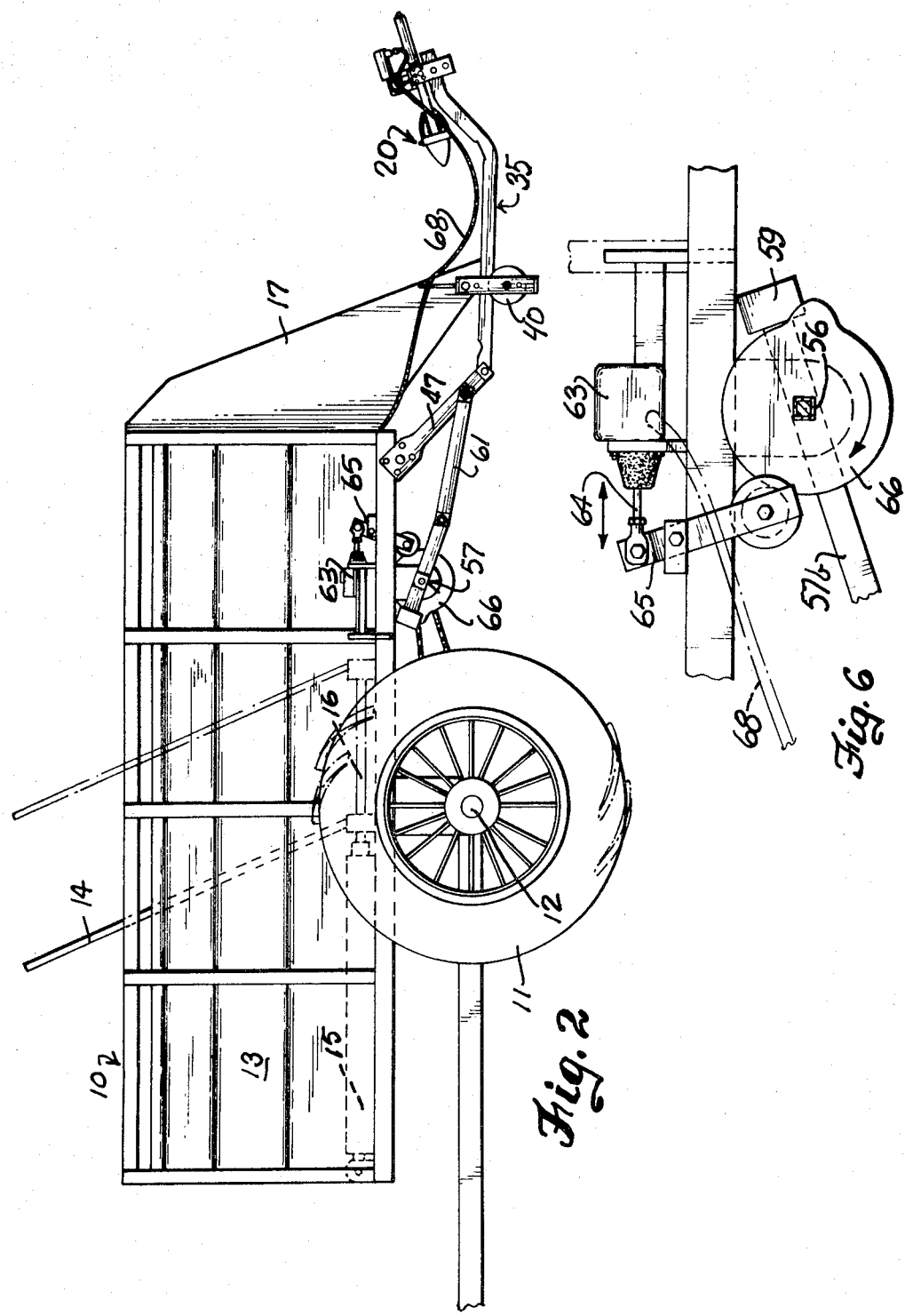
FIG. 2 is a side elevational view of the sugar cane planter of the present invention with the mechanical planting hand in the open plant position.

Referring now to FIGS. 1 and 2, 10 designates a cane cart supported on ground transport wheels 11 carried on an axle 12. Mounted between the sides 13 of the cart 10 is a cane pusher plate 14 moved from the front to the rear of the wagon by a cylinder and ram 15, 16 of the type shown in U. S. Pat. No. 3,387,745. This wagon is built to receive the cane stalks stood on their butt ends and to move the mass of stalks to the rear, right hand end of FIG. 2, to the cane planting hopper.

CANE PLANTING HOPPER

Referring now again to FIGS. 1 and 2 the hopper has side walls 17, 18 which extend to the rear of the wagon and downwardly below the bottom of the wagon. The hopper is closed at its spout like bottom. As best seen in FIG. 1, the plates or side walls 17, 18 diverge upwardly toward the sides of the wagon to define an upward divergent mouth 19 through which the planting hand has access to the cane.

CANE GRASPING MEANS

Figure 4:
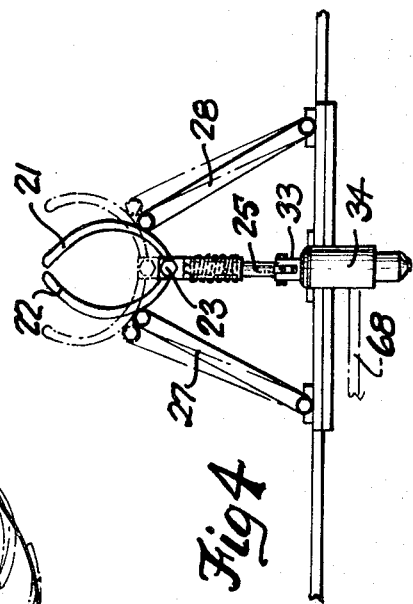
FIG. 4 is a top plan view of the mechanical planting hand employed with the present invention.
Figure 5:
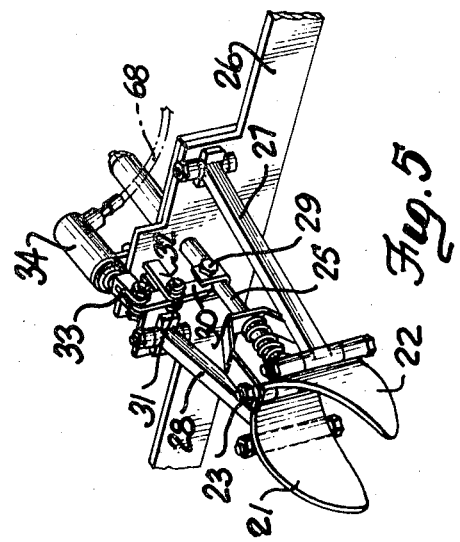
FIG. 5 is a front perspective view of the planting hand of FIG. 4.

The sugar cane stalks to be planted are grasped by a hydraulically actuated mechanical hand designated generally at 20, and which can be better seen and understood from reference to FIGS. 4 and 5. The hand has two jaw like members 21, 22 which are pivoted at 23 on a support guide 24 which operates with a rod 25 passing through support plate 26. Each jaw 21, 22 has a pivotal connection to pivotally mounted support links 27, 28. The operating rod 25 is pivotally connected at 29 to a link 30 which is pivoted at 31 to a lug 32 secured to the support plate. The upper end of like 30 has a pivotal connection to a ram 33 actuated by a hydraulic cylinder 34.

RECIPROCATING MECHANISM

The mechanism for moving the planting hand into and out of the planting hopper, as best seen in FIG. 1 comprises a pair of beams 35, 36 each of which have major portions 35a, 36a, minor portions 35b and 36b connected by an obtuse leg 35c, 36c. At their forward ends the beams 35, 36 are joined by a spacer bar 37 while the support plate 26 which carries the planting hand 20 is secured to the short or minor portions 35b, 36b by adjustable links 38 which are bolted together about the beams 35, 36. The beams 35, 36 are rectangular in cross section and rest upon and ride in grooves 39 in the periphery of rollers 40, 41, which are rotatably mounted in a roller support 42 which is secured to the side walls 17, 18 of the cane hopper.

The forward portions 35a, 36a of the beams are pivotally connected at 43 to lugs 44, 45 carried by a cross beam 46 which has two support arms 47, 48 which are pivoted for rocking movement to the cane cart at 49, 50. This assembly is a swinging frame which reciprocates the beams 35, 36 to move the planting hand 20 into and out of the hopper.

DRIVE SHAFT MEANS

As best seen in FIG. 1, a chain drive 51, driven from the cane wagon axle 12 drives a shaft 52 which through clutch 53 and shifter yoke 54 communicates a mechanical drive to a second chain drive 55 which rotates square shaft 56. Secured to the shaft 56 and rotated therewith are a pair of arms 57, 58 each of which has a minor portion 57a, 58a and a major portion 57b, 58b. The free ends of the minor portions 57a, 58a have counter weights 59, 60, while the free ends of the major portions 57b, 58b are pivotally connected to one end each of a pair of arms 61, 62 which are pivotally connected at their other ends to the swinging frame to reciprocate the planting hand.

The clutch 53 communicates mechanical drive to shaft 52 when the yoke 54 is shifted into engagement by linkage 54a actuated by lever 54b under the control of an operator riding on the rear of the cane wagon on platform 54c. This is to disengage the drive train to the planting hand 20 so that it will not be moved into and out of the planting hopper when the wagon is moved from one planting site to another until planting is to be commenced at which time the clutch is engaged and the entire power train is activated.

As best seen in FIGS. 2 and 6 mounted on the side of the cane wagon 10 is a master cylinder 63 having a plunger 64 pivotally connected to be driven by a pivoted cam follower arm 65 which has a roller to stay in contact and follow the external surface of a cam 66 having a lobe 67. The cam 66 is secured for rotation with the square shaft 56. The master cylinder 63 is connected with the planting hand operating cylinder 34 by hydraulic line 68. The cam 66 may be bolted to a member secured to rotate with the shaft 56 and the cam plate may have openings therethrough to permit shifting of the cam lobe 67 relative to the square shaft to control actuation of the planting hand 20 as variables such as cane size, foleage, etc., arrise.

OPERATION

The cane wagon is connected to a tractor (not shown) and pulled into the field with the lever 54c in the clutch disengaged position so that none of the planting drive train is activated. The wagon 10 is then loaded with seed cane stalks sitting on their butt ends. This is with the pusher plate 14 in the forward position, to the left of FIG. 2. When the wagon is in position over the furrow into which the seed cane is to be planted the clutch 53 is engaged by shifting the lever 54b to move the yoke 54 at which time the chain drive 51 being driven by the ground wheels 11 will drive shaft 52 which through chain drive 55 will rotate square shaft 56. This causes arms 57, 58 to rotate which through their pivotal connections with arms 61, 62 will cause the swinging frame to swing about pivots 49, 50 and rock cross beam 46 converting the rotary drive of shaft 56 to a reciprocating drive to move the beams 35, 36 in a rectilinear motion to move the planting hand 20 into and out of the cane hopper.

Figure 3:
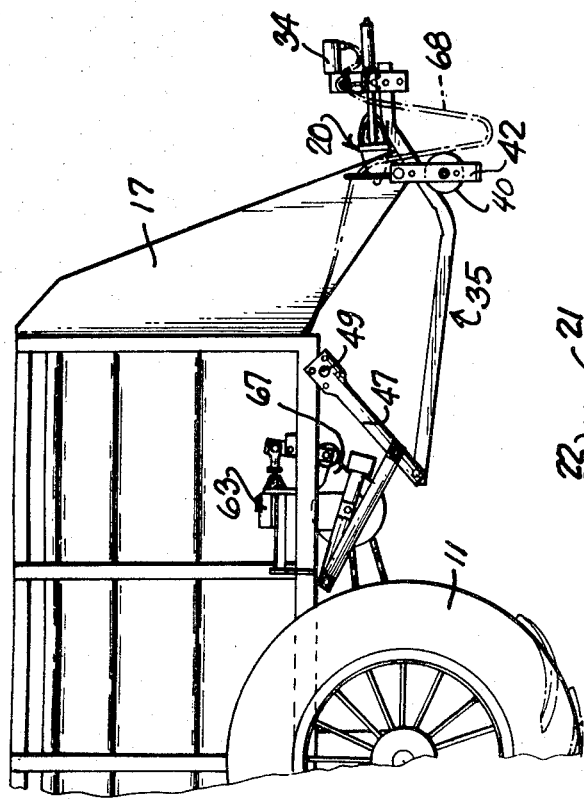
FIG. 3 is a fragmentary side elevation view similar to FIG. 2 with the mechanical planting hand in the cane grasping position.

With the vehicle in the position shown in FIG. 2 planting is about to begin. As the arms 47, 48 are swung forward, to the left in FIGS. 2 and 3 which moves the entrained beams 35, 35 from the position of FIG. 2 to that of FIG. 3. The intermediate portion 35c, 36c of beams 35, 36 ride over and down the rollers 39 which cause the entrained planting hand to move toward the hopper into the mouth 19 and to descend into cane grasping relationship in the hopper as shown in FIG. 3. With the lobe of cam 66 properly positioned when the above described movement of the planting hand has taken place the master cylinder will spirit hydraulic fluid through line 68 to cylinder 34 which will cause the jaws 21, 22 to close about the seed cane stalks. When the arms 57, 58 continue to rotate the arms 47, 48 are then shifted to the position of FIG. 2 which moves the planting hand and its grasped stalks to be raised clear of the hopper and pulled rearwardly. The cam 66 then signals the hydraulic system to bleed off and the jaws 21, 22 drop the cane in the furrow. This sequence is continued until the wagon has traversed the length of the furrow. As cane is removed from the hopper the pusher plate 14 moved by the cylinder and ram 15, 16 keeps moving the cane into the planting hopper.

Figure 7:
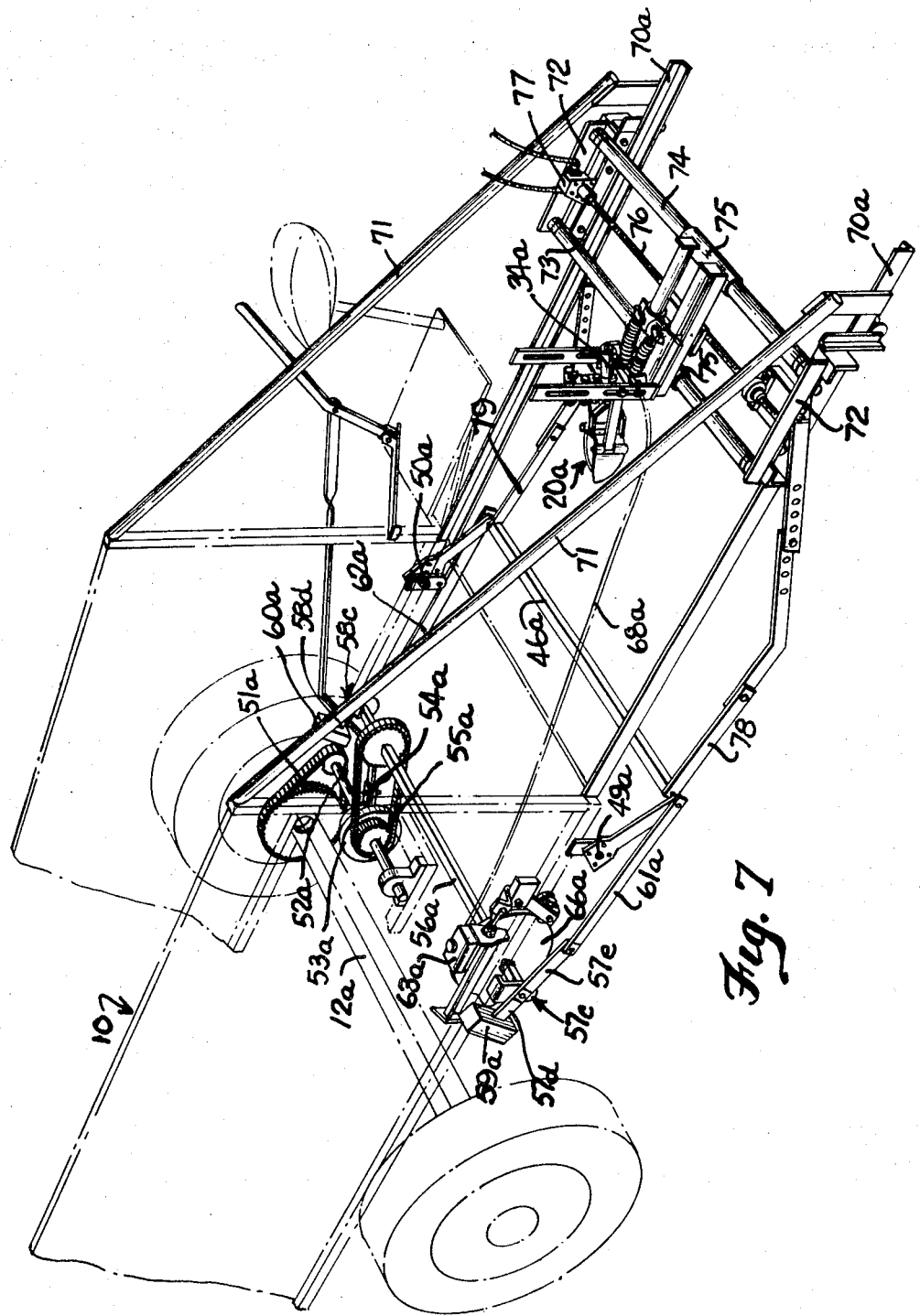
FIG. 7 is a perspective view of a modified form of sugar cane planter of the present invention showing its position relative to a cane wagon.

A modified form of the planter of the present invention is shown in FIG. 7 in which a chain drive 51a, driven from the cane wagon axle 12a drives a shaft 52a which through clutch 53a and shifter yoke 54a communicates a mechanical drive to a second chain drive 55a which rotates square shaft 56a. Secured to the shaft 56a and rotated therewith are a pair of arms 57c, 58c each of which has a minor portion 57d and 58d and a major portion 57e and 58e. The free ends of the minor portions 57d and 58d have counter weights 59a and 60a, while the free ends of the major portions 57e and 58e are pivotally connected to one end each of a pair of arms 61a and 62a which are pivotally connected at their other ends to the swinging frame 46a to reciprocate the planting hand 20a.

While the planting hand in this form of the invention is constructed as described herein before the reciprocating mechanism is modified over that shown in FIG. 1. A horizontal frame 70 is secured to the rear of the cane cart 10 and braced at 71. The horizontal members 70a are of angle iron construction to define a guide rail which acts as a track for grooved rollers on a reciprocating carriage 72. This carriage has a pair of spaced guides 73, 74 over which a slidable support 75 is movable from right to left and vise versa. The slidable support 75 has the planting hand 20a mounted thereon. The carriage 72 is driven back and forth by a worm shaft 76 passing through a worm block secured to the underside of the carriage 75. Shaft 76 is driven by a reversible hydraulic motor 77. As the cross beam 46a rocks about the pivots 49a, 50a linkages 78, 79, one end of which is connected to the cross beam and the other end of each of which is connected to the carriage 72 cause the carriage 72 to reciprocate on the horizontal members 70a toward and away from the rear open end of the cane cart 10 so that the planting hand 20a is introduced into the cart 10 to grasp the stalks to be planted, close upon them and the carriage 72 is then moved rearwardly, as shown in FIG. 5 to discharge the stalks into the furrow. The hydraulic mechanism for actuating the hand 20a operates in the same manner as described in FIG. 6 since the cam 66a mounted on square shaft 56a actuates the master cylinder 63a which in turn supplies actuating fluid through line 68a to hand operating cylinder 34a. Furrow guide plates may be hung from the frame members 70 to provide a horizontal slot in vertical registry with the furrow to guide the stalks dropped from the planting hand 20a into the furrow.

What is claimed is:

1. For use with a cane cart supported on ground transport wheels mounted on an axle and having a cane stalk pusher plate mounted in the cart to be moved to the rear of the cart for moving cane stalks standing on their butt ends to the rear of the cart; a cane planter comprising cane grasping means carried by said cart and being movable into and out of the rear of the cart between a cane grasping position and a cane planting position, reciprocating means carried by said cart and being connected to said cane grasping means for moving it between said cane grasping position and cane planting position, drive shaft means mounted on said cart and being connected to be selectively driven by the cane cart axle, conversion drive means connected between said drive shaft means and said reciprocating means to convert the rotary drive from said drive shaft into a rectilinear motion to reciprocate said reciprocating means, and hydraulic means connected between said drive shaft and cane grasping means to actuate said cane grasping means in timed relationship to the over ground speed of the cane cart.

2. A cane planted as claimed in claim 1 further comprising a stalk feed hopper having an open rear end and being positioned at the rear of the cart to receive cane stalks standing on their butt ends and fed thereto by the pusher plate.

3. A cane planter as claimed in claim 2 wherein the stalk feed hopper has a closed bottom extending beneath the bottom of the cane cart and upwardly divergent side walls which form a mouth into which the cane grasping means is introduced to pick up cane stalks.

4. A cane planter as claimed in claim 1 wherein said cane grasping means comprises a pair of pivotally mounted jaws movable between an open and closed position by a hydraulically actuated linkage.

5. A cane planter as claimed in claim 1 wherein said reciprocating means carried by the cart comprises a pair of parallel mounted beams each having substantially parallel legs joined by an obtuse intermediate member, grooved roller guide means over which each leg reciprocates, means connected to and joining the rear of said legs for supporting said cane grasping means, and means connected to the other end of said legs to impart a reciprocatory motion to said legs.

6. A cane planter as claimed in claim 1 wherein said drive shaft means comprises a square shaft journaled for rotation rearwardly of said cart axle and chain driven thereby.

7. A cane planter as claimed in claim 1 wherein said conversion drive means comprises a first pair of arms secured to rotate with said drive shaft means, a second pair of arms pivoted to one end of each of said first pair of arms and pivoted to a pivotally mounted frame which is pivotally connected to said reciprocating means.

8. A cane planter as claimed in claim 1 wherein said hydraulic means comprises a master hydraulic cylinder, a cam secured to rotate with said drive shaft means, a cam follower positioned to ride about the cam surface and being connected to said master cylinder to actuate same upon said follower being engaged by the cam lobe, hydraulic means for opening and closing said cane grasping means, and a hydraulic line between said master cylinder and the hydraulic means for opening and closing said cane grasping means to close said cane grasping means when said reciprocating means is in its most forward position and to open the cane grasping means when said reciprocating means is in its rear most position.

* * * * *